(12) United States Patent
Kunz

(10) Patent No.: US 10,814,411 B2
(45) Date of Patent: Oct. 27, 2020

(54) BAND SAW MACHINE

(71) Applicant: August Moessner GmbH & Co. KG, Eschach (DE)

(72) Inventor: Christian Kunz, Eschach (DE)

(73) Assignee: August Moessner GmbH & Co. KG, Eschach (DE)

( * ) Notice: Subject to any disclaimer, the term of this patent is extended or adjusted under 35 U.S.C. 154(b) by 0 days.

(21) Appl. No.: 16/243,929

(22) Filed: Jan. 9, 2019

(65) Prior Publication Data

US 2019/0210127 A1 Jul. 11, 2019

(30) Foreign Application Priority Data

Jan. 10, 2018 (DE) ..................... 10 2018 100 457.5

(51) Int. Cl.
*B23D 53/00* (2006.01)
*B23D 55/08* (2006.01)
*B23D 55/02* (2006.01)

(52) U.S. Cl.
CPC ......... *B23D 55/082* (2013.01); *B23D 53/005* (2013.01); *B23D 55/02* (2013.01)

(58) Field of Classification Search
CPC .... B23D 53/005; B23D 53/008; B23D 55/02; B23D 55/023; B23D 55/082; B23D 55/10
See application file for complete search history.

(56) References Cited

U.S. PATENT DOCUMENTS

| | | | | |
|---|---|---|---|---|
| 562,042 A * | 6/1896 | Shaw | ..................... | B23D 55/10 83/818 |
| 1,416,355 A * | 5/1922 | Johnson | ............... | B23D 53/005 83/806 |
| 2,809,679 A * | 10/1957 | Norquist | .............. | B23D 53/008 83/785 |
| 5,320,016 A | 6/1994 | Spath et al. | | |
| 2009/0288540 A1* | 11/2009 | Yeh | ........................ | B23D 53/00 83/788 |
| 2011/0000355 A1* | 1/2011 | Lin | ...................... | B23D 53/005 83/796 |

FOREIGN PATENT DOCUMENTS

| | | | |
|---|---|---|---|
| CN | 102350739 A | 2/2012 | |
| CN | 103658849 A | 3/2014 | |
| DE | 2805156 A1 | 8/1979 | |
| DE | 4005143 A1 | 8/1991 | |
| DE | 202008006710 U1 | 7/2008 | |
| GB | 21387 A * | 11/1912 | |
| GB | 2293347 A * | 3/1996 | ........... B23D 55/046 |
| KR | 20030057260 A | 7/2003 | |

* cited by examiner

*Primary Examiner* — Stephen Choi
(74) *Attorney, Agent, or Firm* — Wells St. John P.S.

(57) ABSTRACT

A band saw machine has two deflection pulleys arranged one above the other in the vertical direction, an endless saw band, which is guided around the deflection pulleys and which has an upward running portion and a downward running portion, and a machine frame, which has a saw neck for holding at least the upper deflection pulley. The deflection pulleys are arranged substantially parallel to a front edge of the machine frame, so that both the upward running portion and the downward running portion of the saw band face towards the front edge with their cutting edges. The saw neck is arranged offset from the deflection pulleys from the front edge (6) to the rear. Both the upward running portion and the downward running portion of the saw band are at least partially exposed between the deflection pulleys.

9 Claims, 5 Drawing Sheets

BAND SAW MACHINE

CROSS REFERENCE TO RELATED APPLICATION

This application claims priority to German Patent Application No, 102018100457.5, which was filed Jan. 10, 2018, the teachings of which are incorporated herein by reference.

The invention relates to a band saw machine having two deflection pulleys arranged one above the other in the vertical direction, having an endless saw band, which is guided around the deflection pulleys and which has an upward running portion and a downward running portion, and having a machine frame, which has a saw neck for holding at least the upper deflection pulley.

Band saw machines of the generic type are known from the general prior art. These are also referred to as vertical band saws, since their deflection pulleys, around which the saw band revolves, are arranged one above the other in the vertical direction. The deflection pulleys are generally arranged perpendicular to a front edge, which faces towards the user of the band saw machine, of the machine frame, wherein usually a downward running portion of the saw band faces towards the front edge and an upward running portion of the saw band is located in a rear region of the machine frame. In this way, easy accessibility to the saw band is intended to be afforded to the user.

In part, such band saw machines are used for the automated sawing of larger workpieces, such as, for instance, castings. The workpiece to be sawn is here frequently held by a multi-axis robot and moved relative to the saw band. In order to provide the multi-axis robot with the necessary freedom of movement, band saw machines are used in different versions, wherein, in dependence on the position of the saw neck holding the upper deflection pulley, they are divided into left-hand and right-hand versions.

Lightweight automotive construction, in particular, increasingly contributes to the increase in complexity of castings. Furthermore, due to the number of different casting versions which are to be machined, the requirements in terms of the flexibility of such band saw machines which interact with multi-axis robots are rising. Different versions of the workpieces frequently also require the greater number of degrees of freedom of the above-mentioned left-hand and right-hand versions of band saw machines.

This sometimes leads in practice to the situation that, in a saw cell fed by a multi-axis robot, two band saw machines are used, of which one is then used in a left-hand, and the other in a right-hand version. This results in not only an increased demand for band saw machines, and hence increased expenditure, but also an increased spatial requirement.

A further problem with known band saw machines frequently consists in the fact that, between the saw band and the saw neck, generally only a very small clearance is present, which limits the mobility of the multi-axis robot and the size of the workpiece to be sawn. However, the distance between the saw neck and the saw band cannot be optionally altered, since this is only possible via an appropriate enlargement of the diameter of the deflection pulleys, which in turn enlarges the band saw machine as a whole and hence further increases the spatial requirement.

In DE 40 05 143 A1 a vertical band saw is described in which the saw neck bearing both deflection pulleys is pivotable about a vertical rotational axis. As a result, mitre cuts, too, should be able to be easily performed. However, such a band saw machine is, on the one hand, very complex and, on the other hand, specifically in automated sawing, offers no great advantages, since mitre cuts can also be achieved by appropriate positioning of the workpiece by means of the multi-axis robot.

The object of the present invention is therefore to provide a band saw machine which in particular, but not exclusively in the case of joint usage with one or more multi-axis robot(s), affords higher flexibility to this or these same.

According to the invention, this object is achieved by the features stated in Claim 1.

As a result of the inventive arrangement of the two deflection pulleys substantially parallel to the front edge of the machine frame and such that the cutting edges both of the upward and of the downward running portion of the saw band face towards the front edge, both portions of the saw band are exposed, so that workpieces can be sawn with both portions. This results in considerably better usability of the band saw machine according to the invention, since, on one and the same saw band, two workpieces can in principle be sawn simultaneously.

Furthermore, the solution according to the invention combines, due to the arrangement of the saw band that is achieved by the positioning of the deflection pulleys, the advantages of a left-hand and a right-hand version of a band saw machine, which leads to a further increase in the degrees of freedom in the use of the band saw machine and to easier machinability of the very different workpieces associated therewith. In this way, the band saw machine according to the invention can be better utilized, whereby, in particular in relation to the simultaneous use of two machines, costs can be saved.

Because, according to the invention, the saw neck is offset to the rear from the deflection pulleys, a very large amount of space is obtained between the saw band and the saw neck, as well as to the left of the upward and to the right of the downward running portion of the saw band, so that even complex and/or large workpieces can easily be sawn between the saw band and the saw neck. A large clearance, which simplifies the handling of the workpieces, can in this way also be obtained.

The saw band is here, as a result of its arrangement in the region of the front edge of the machine frame, always very easily accessible, which still further simplifies the machining of the workpieces.

In a very advantageous refinement of the invention, it can be provided that the deflection pulleys are arranged offset to the rear by less than 20 cm, preferably by less than 10 cm, from the front edge of the machine frame. As a result of the offsetting of the deflection pulleys to the rear, parts separated from a workpiece to be sawn can be better received by the front edge of the band saw, which front edge is in this case formed by a chip deflector plate.

In order to be able to easily and reliably dispose of chips arising during machining, it can additionally be provided that between the deflection pulleys a conveyor belt is arranged running substantially parallel to the front edge of the machine frame.

It can here be provided that the conveyor belt is oriented substantially horizontally, whereby chips and sawn-off parts can be transported away very easily.

Furthermore, it can be provided that the saw band, in the region facing towards the upper deflection pulley, is guided on guide arms, whereby very good guidance of the saw band, and hence exact machining of the workpieces, is obtained.

In this context, it can be provided that the guide arms are adjustable by means of respective drive mechanisms. As a result, the guidance of the saw band is able to be altered very easily.

In order to create a large distance between the two portions, running in opposite directions, of the saw band, which is advantageous for the machining of larger workpieces, it can further be provided that the deflection pulleys have a diameter of 80 to 120 cm, preferably about 100 cm.

A simple design of the machine frame of the band saw machine according to the invention is obtained if the saw neck has a self-supporting frame.

Below, an illustrative embodiment of the invention is represented in basic outline with reference to the drawing, wherein.

Figure 1:
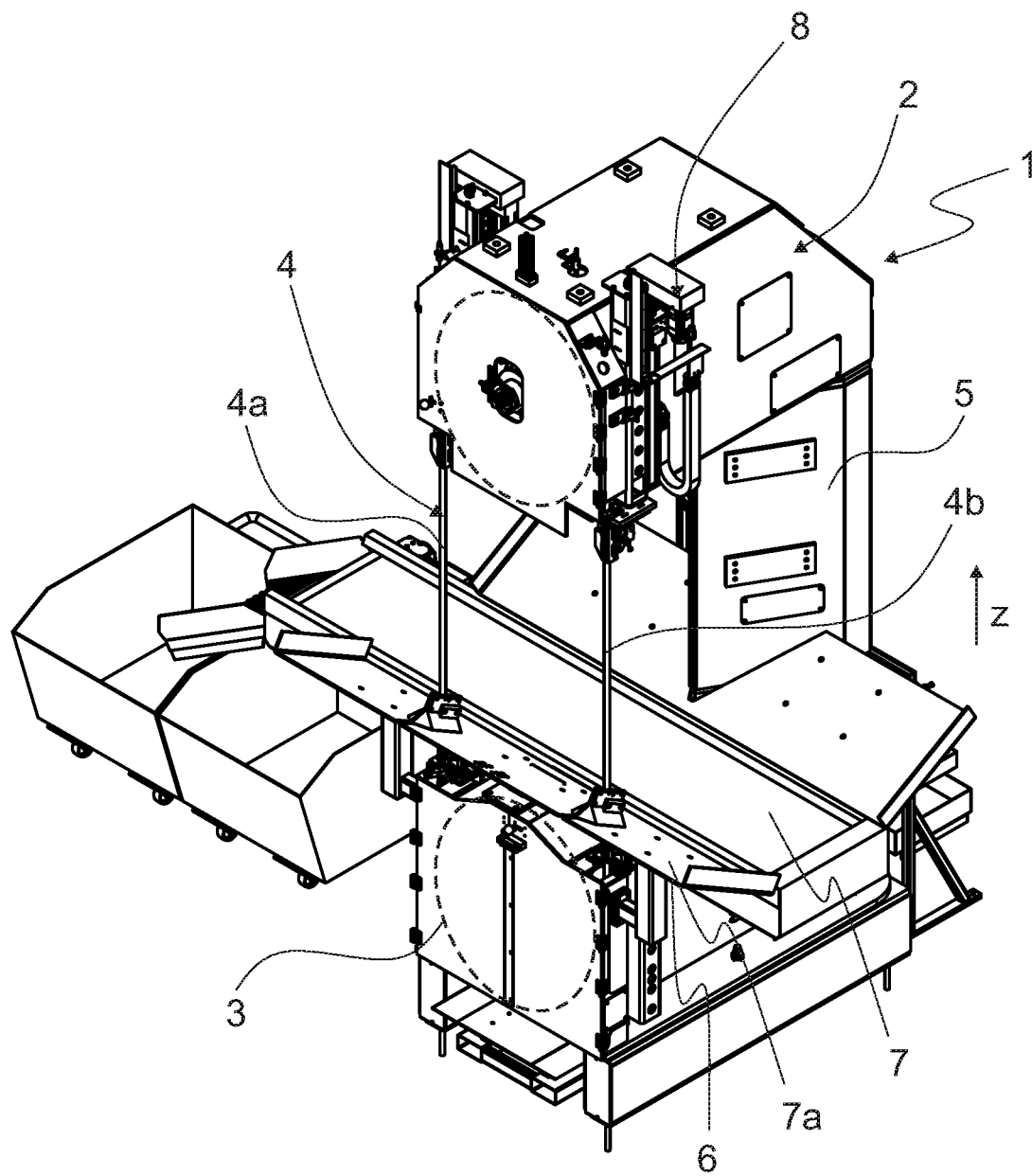
FIG. 1 shows a first perspective view of a band saw machine according to the invention.
Figure 2:
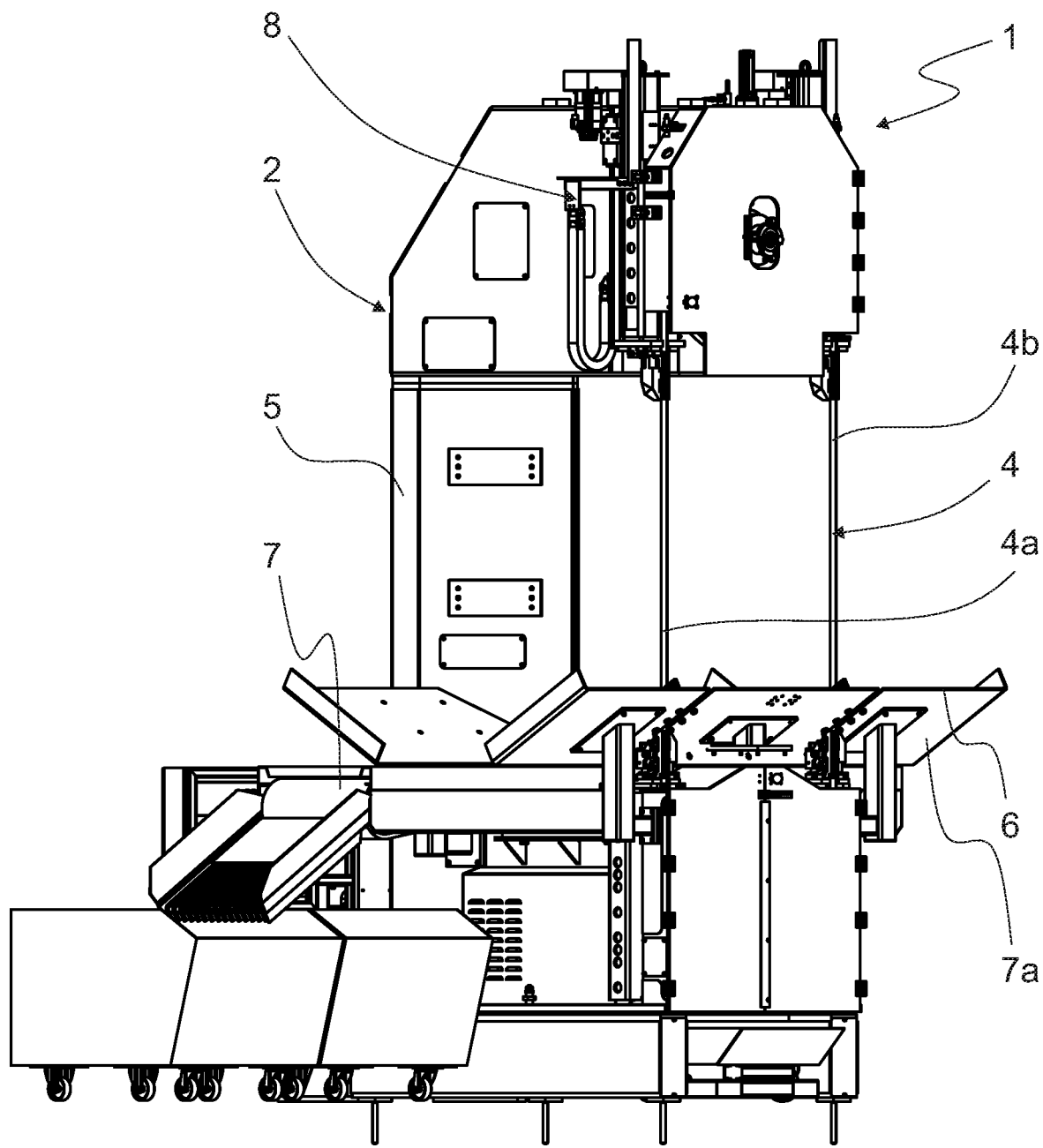
FIG. 2 shows a further perspective view of the band saw machine according to the invention.
Figure 3:
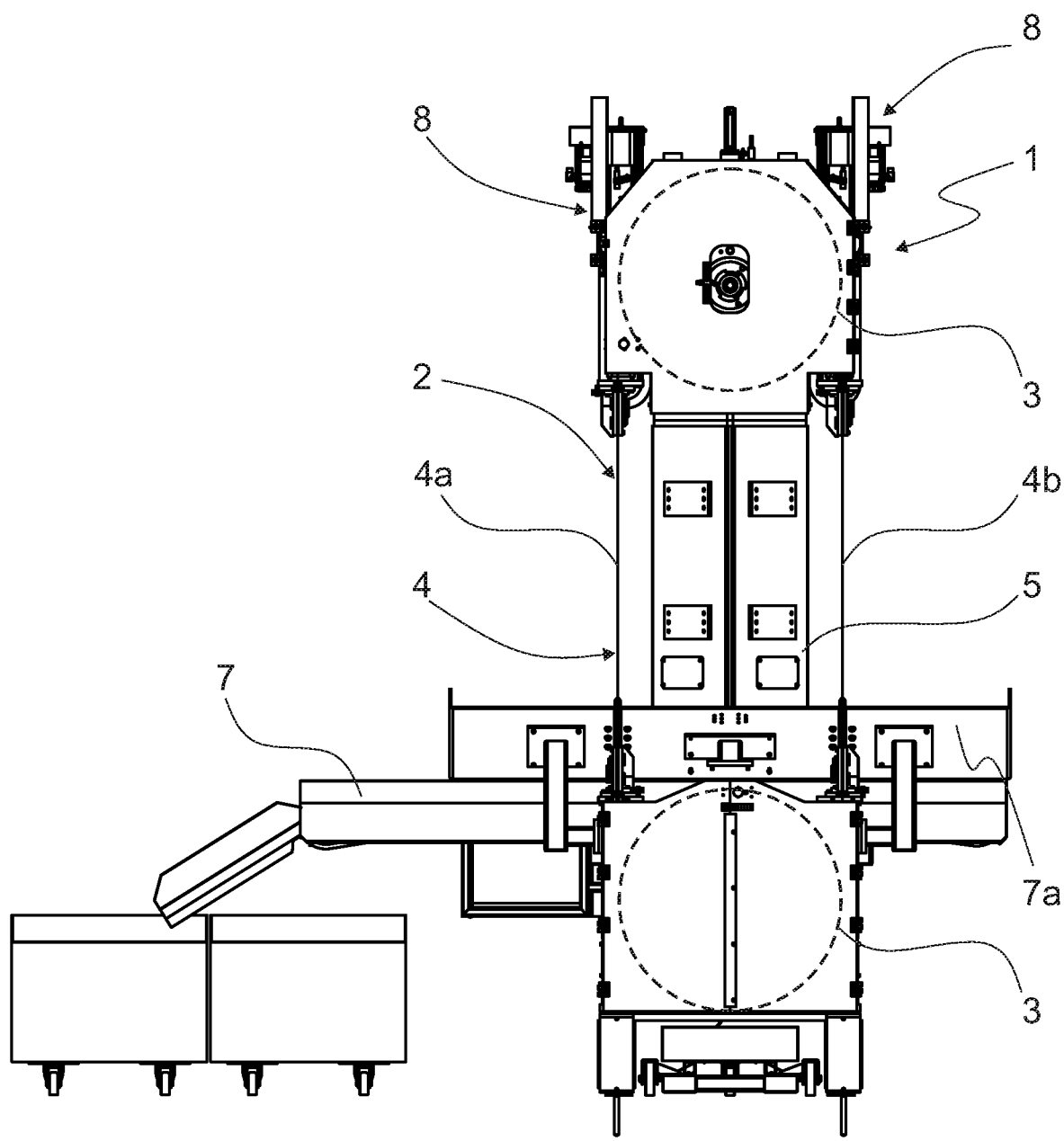
FIG. 3 shows a front view of the band saw machine according to the invention.
Figure 4:
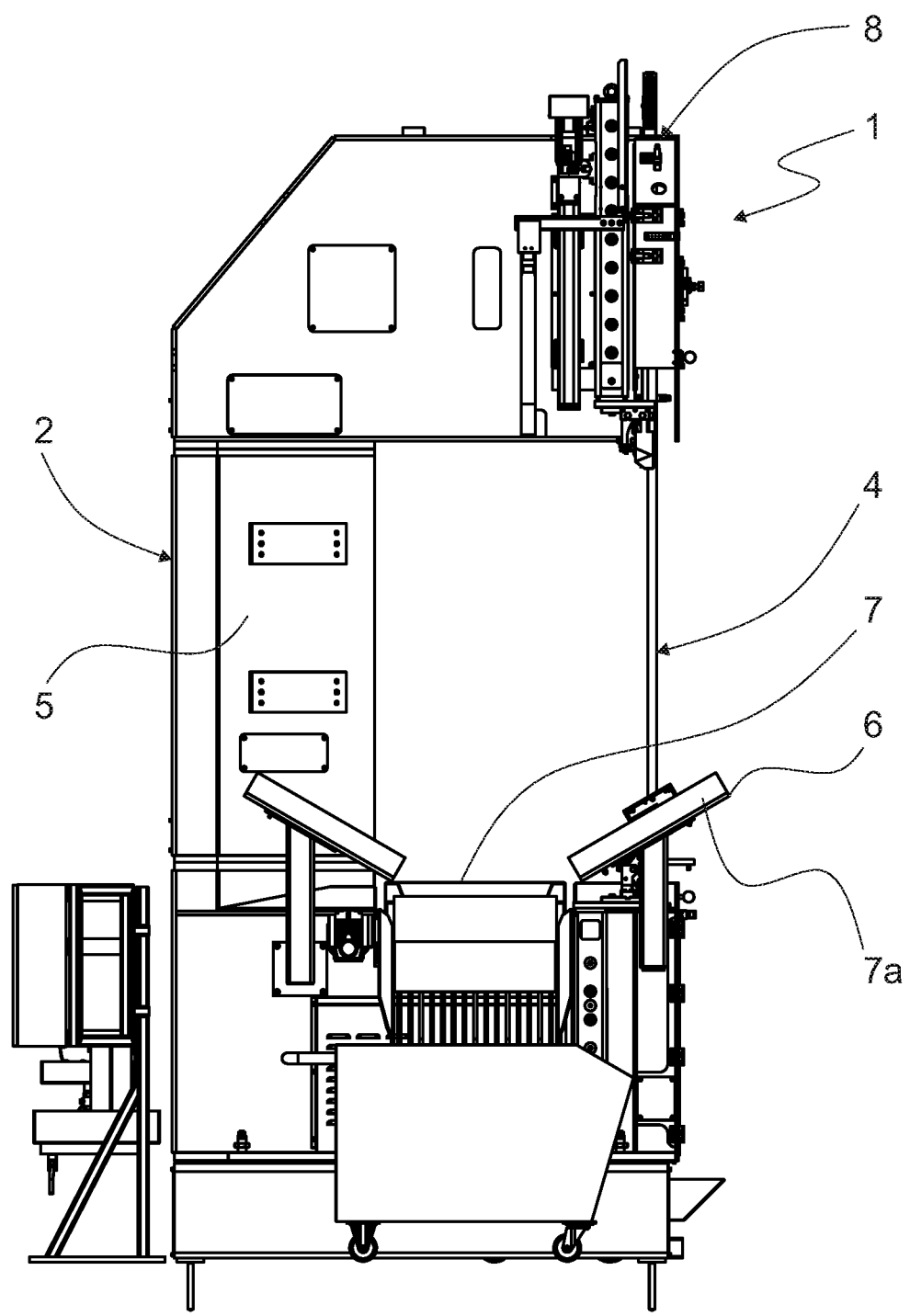
FIG. 4 shows a side view of the band saw machine according to the invention.

FIG. 1 shows a band saw machine 1, which has a machine frame 2. In FIGS. 1 and 3 deflection pulleys 3 indicated only schematically by means of dashed lines are arranged in the machine frame 2. The two deflection pulleys 3 are arranged one above the other in the vertical direction denoted by "z". Furthermore, the band saw machine 1 has an endless saw band 4 guided around the deflection pulleys 3.

The upper deflection pulley 3 is in the present case held by a saw neck 5, which is part of the machine frame 2. The saw neck 5 can have a self-supporting frame, which is formed, for instance, by a sheet-metal construction and in the interior of which supply lines, for example, can be found.

The saw band 4 has an upward running portion 4a and a downward running portion 4b. In the present case, if it is assumed that the deflection pulleys 3 rotate clockwise, the upward running portion 4a is arranged on the left and the downward running portion 4b on the right. Of course, the deflection pulleys 3, which are driven in a manner which is known per se by means of a drive mechanism (not represented) configured, for instance, as an electric motor, could also rotate anti-clockwise, so that the positions of the upward running portion 4a and of the downward running portion 4b of the saw band 4 would be reversed. In this case, the orientation of the teeth of the saw band 4 would have to be adapted.

In the present case, the lower deflection pulley 3 is driven by means of a drive mechanism, whereas the upper deflection pulley 3 is idle and is driven by the saw band 4. In principle, it would also, however, be possible to arrange the drive mechanism such that it drives the upper deflection pulley 3.

The deflection pulleys 3 are arranged substantially parallel to a front edge 6 of the machine frame 2. The front edge 6 is constituted by that region of the machine frame 2 which lies opposite the rearwardly offset saw neck 5 or which is found on the opposite side of the saw neck 5. In principle, the front edge 6 can be any front border of the machine frame 2. In the present case, it is that side of a chip deflector plate 7a belonging to a conveyor belt 7 (the function of which is described at a later point) which faces away from the saw neck 5. If this chip deflector plate 7a is not present, it could also be the front cover of the lower deflection pulley 3 or a door which affords access to the lower deflection pulley 3. The important point about the arrangement of the deflection pulleys 3 is that these same are arranged rotated through substantially 90° in relation to known solutions.

As a result of this arrangement of the deflection pulleys 3 parallel to the front edge 6 of the machine frame 2 or rotated through 90° in comparison to known solutions, both the upward running portion 4a and the downward running portion 4b of the saw band 4 are exposed and face towards the front edge 6 with their cutting edges (not represented). In principle, the saw band 4 could also be fitted the other way round, so that the cutting edges point in the direction of the saw neck 5. In that case, further adaptations to various components of the band saw machine 1 may be necessary.

As already mentioned, the saw neck 5 is arranged offset from the deflection pulleys 3 from the front edge 6 to the rear, so that a comparatively large clearance is present between the two portions 4a and 4b of the saw band 4. Furthermore, both the upward running portion 4a and the downward running portion 4b of the saw band 4 are at least partially exposed between the deflection pulleys 3, whereby both portions 4a and 4b are accessible and a plurality of workpieces (not represented) can be sawn simultaneously by means of the saw band 4.

Depending on the size of the band saw machine 1 and of the machine frame 2, the deflection pulleys 3 are arranged offset to the rear by less than 20 cm, preferably by less than 10 cm, in relation to the front edge 6 of the machine frame 2.

In the present case the conveyor belt 7 is found between the deflection pulleys 3 and runs substantially parallel to the front edge 6 of the machine frame 2, which preferably runs substantially horizontally. With the conveyor belt 7, chips and parts sawn off from the workpiece to be machined can be transported away. Furthermore, the direction of running of the conveyor belt 7 can be reversed during operation, in order, for instance, to be able to transport waste parts consisting of different materials in different directions.

The deflection pulleys 3 can have a diameter of 80-120 cm, preferably about 100 cm. As a result, an appropriate clearance is also obtained between the two portions 4a and 4b of the saw band 4, so that even very large workpieces can be sawn with the band saw machine 1.

Figure 5:
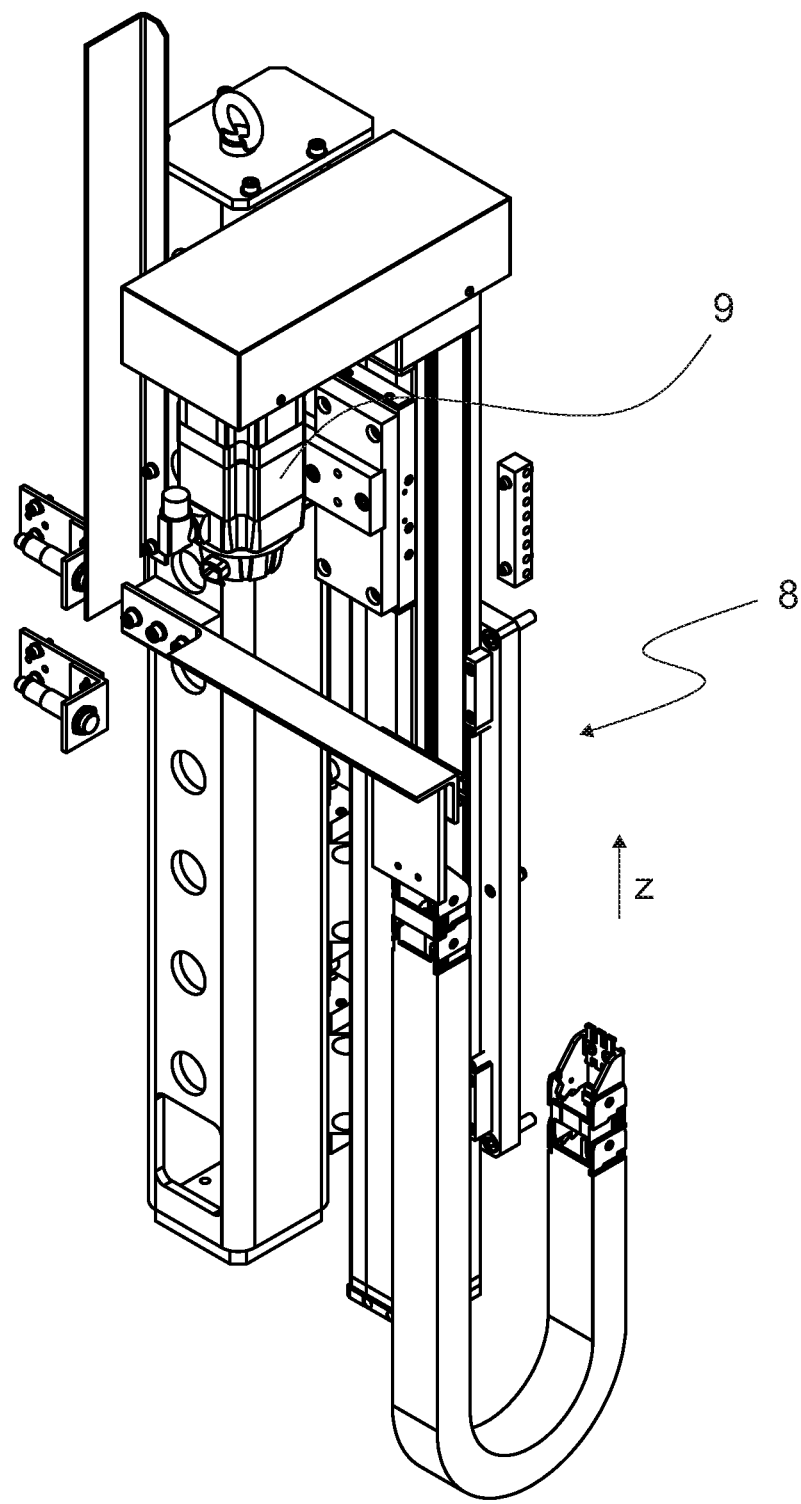
FIG. 5 shows a guide arm belonging to the band saw according to the invention.

On the region facing towards the upper deflection pulley 3, the saw band 4 is in the present case guided on respective guide arms 8. One of the guide arms 8 is represented in greater detail in FIG. 5. It is here evident that the guide arms 8 have respective drive mechanisms 9, with which they can be adjusted in the vertical direction z. The free length of the two portions 4a and 4b of the saw band 4 can thereby be altered. The controlling of the drive mechanism 9 can be realized by means of a control device (not represented), which can be designed in a manner which is known per se and which, for instance, can also assume total control of the operation of the band saw machine 1.

The band saw machine 1 can be part of a production line (not represented) for workpieces on which one or more saw cuts must be made. In this production line one or more multi-axis robot(s) can also be integrated, which hold the workpieces and move them in relation to the saw band 4, so that the saw cut is performed in the desired manner.

The invention claimed is:

1. Band saw machine having two deflection pulleys arranged one above the other in the vertical direction, having an endless saw band, which is guided around the deflection pulleys and which has an upward running portion and a downward running portion, and having a machine frame, which has a saw neck for holding at least the upper deflection pulley, characterized in that the deflection pulleys are arranged substantially parallel to a front edge of the machine frame, so that both the upward running portion and the downward running portion of the saw band face towards the front edge with their cutting edges, in that the saw neck is arranged offset from the deflection pulleys from the front edge to the rear, and in that both the upward running portion and the downward running portion of the saw band are at least partially exposed between the deflection pulleys; and wherein a conveyor belt is arranged between the deflection pulleys, the saw band and the saw neck, and wherein the conveyor belt runs substantially parallel to the front edge of the machine frame.

2. Band saw machine according to claim 1, characterized in that the deflection pulleys are arranged offset to the rear by less than 20 cm in relation to the front edge of the machine frame.

3. Band saw machine according claim 1, characterized in that the conveyor belt is oriented substantially horizontally.

4. Band saw machine according to claim 3, characterized in that guide arms are adjustable by means of respective drive mechanisms.

5. Band saw machine according to claim 1, characterized in that the saw band is in the region facing towards the upper deflection pulley guided on guide arms.

6. Band saw machine according to claim 1, characterized in that the deflection pulleys have a diameter of 80 to 120 cm.

7. Band saw machine according to claim 1, characterized in that the saw neck has a self-supporting frame.

8. Band saw machine according to claim 1, characterized in that the deflection pulleys are arranged offset to the rear by less than 10 cm in relation to the front edge of the machine frame.

9. Band saw machine according to claim 1, characterized in that the deflection pulleys have a diameter of about 100 cm.

* * * * *